H. O. BAKER.
HYDROCARBON BURNER.
APPLICATION FILED FEB. 26, 1918.
1,323,998.
Patented Dec. 2, 1919.
5 SHEETS—SHEET 2.
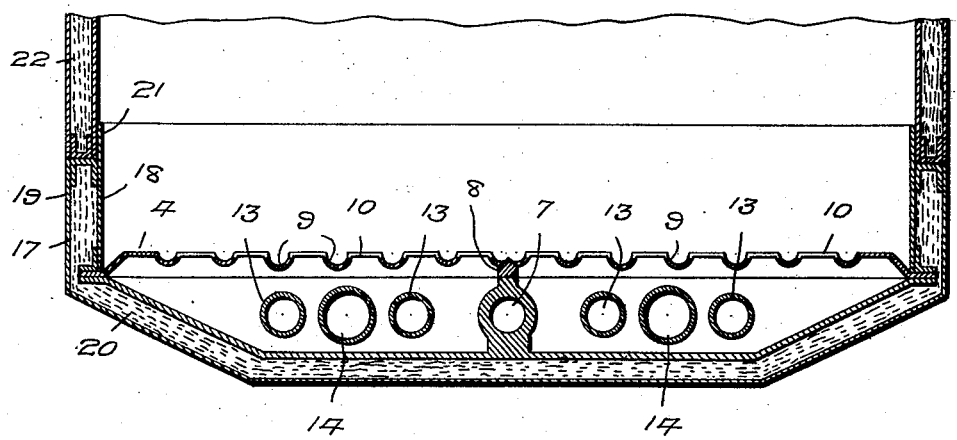
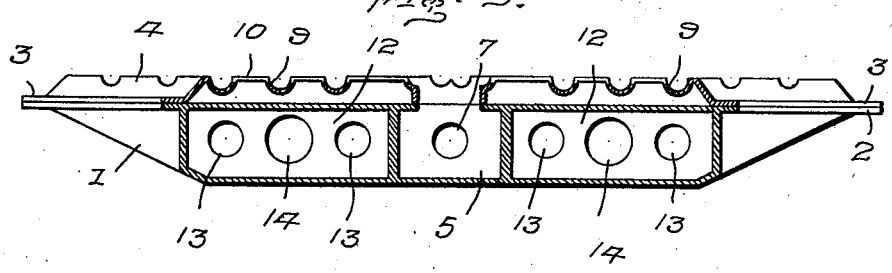
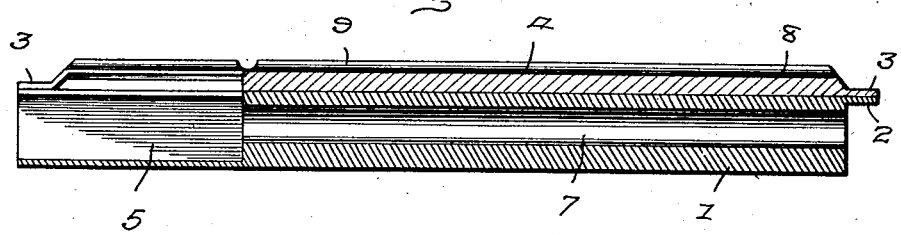
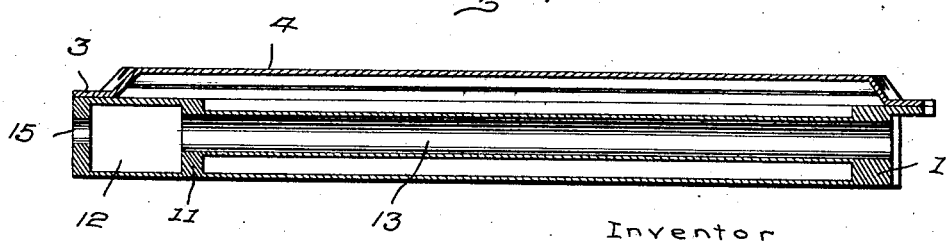
Inventor
Hartley O. Baker
Fitzgerald & Co
Attorneys

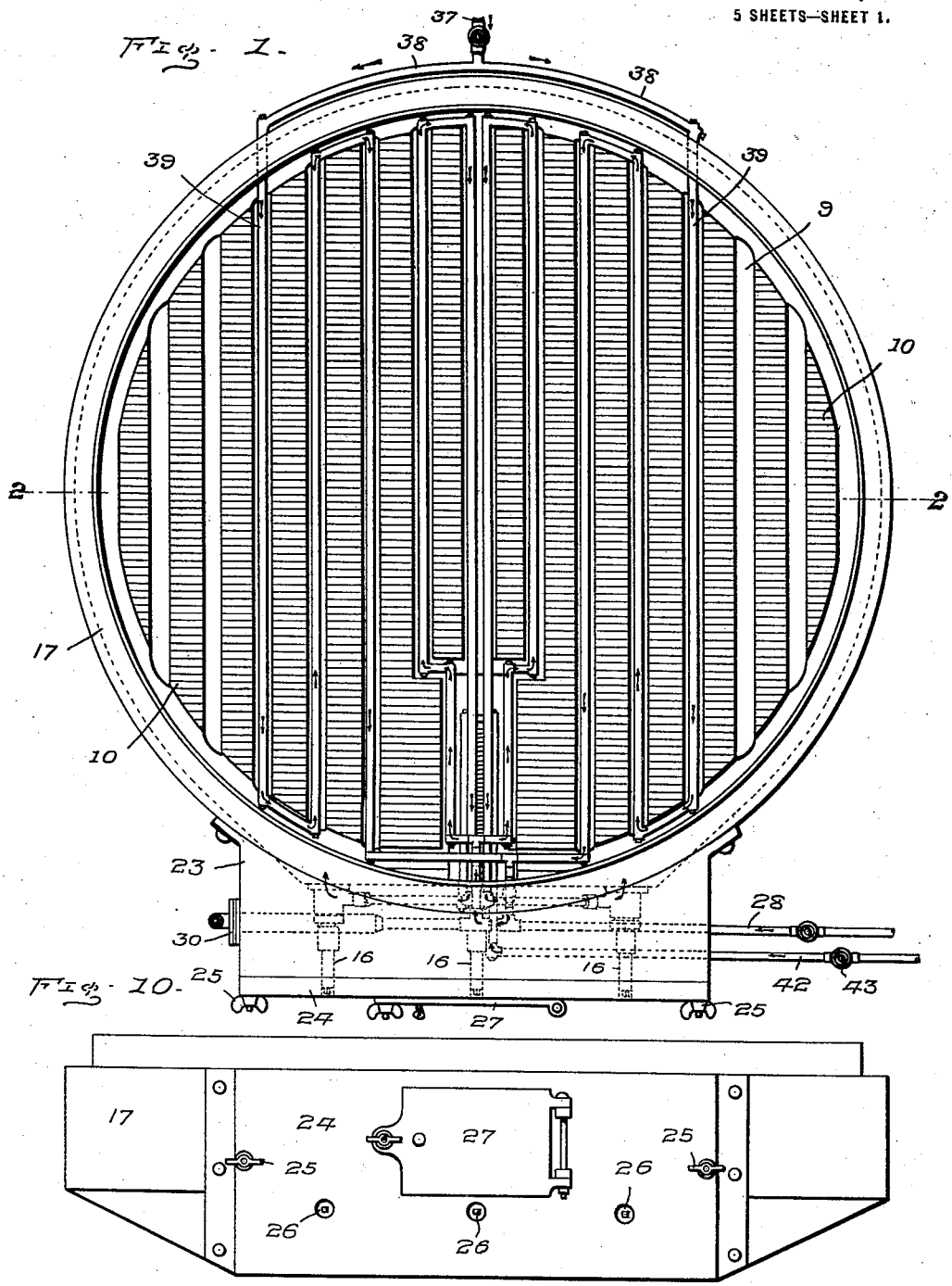

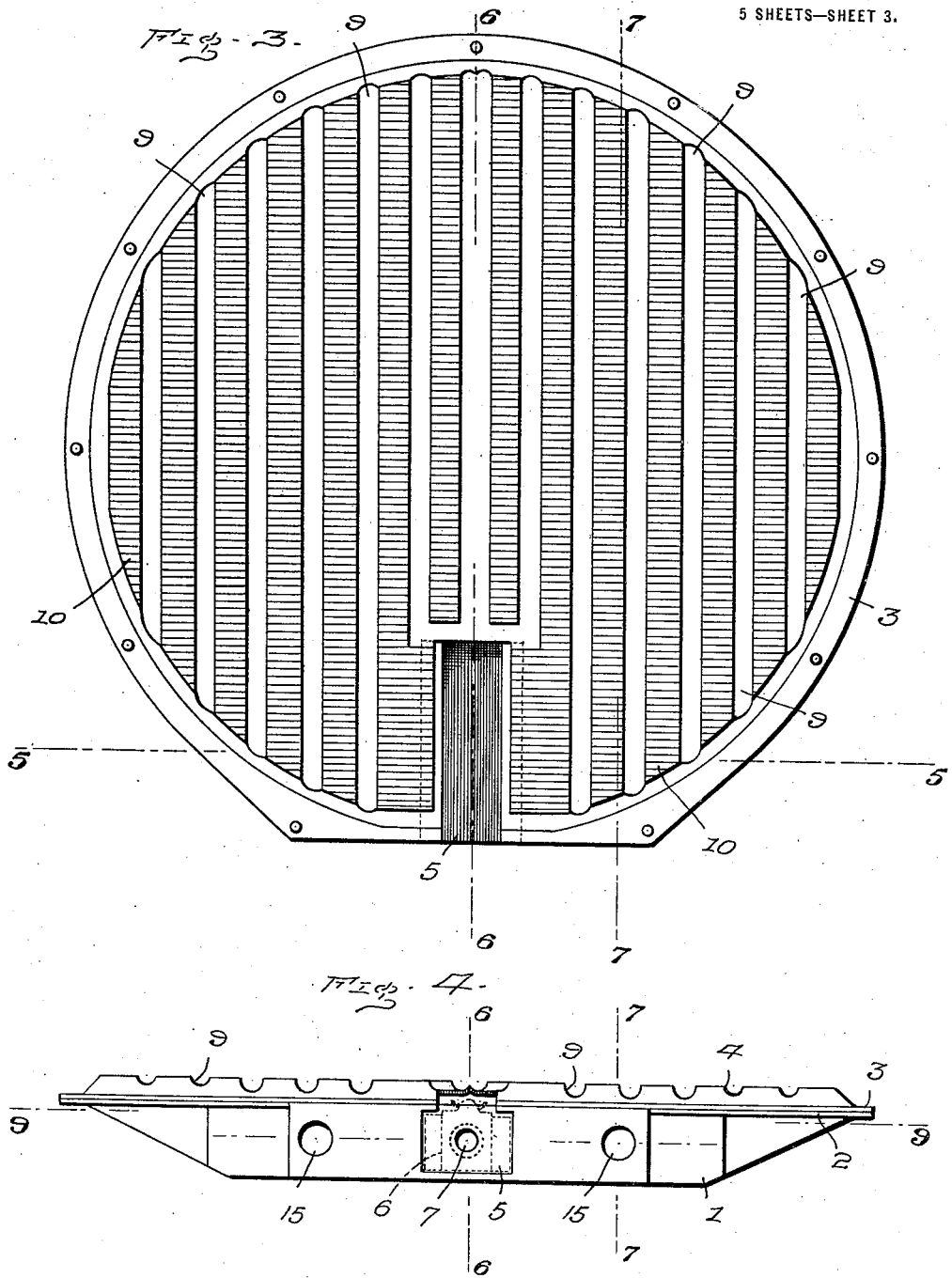

H. O. BAKER.
HYDROCARBON BURNER.
APPLICATION FILED FEB. 26, 1918.
1,323,998.
Patented Dec. 2, 1919.
5 SHEETS—SHEET 4.
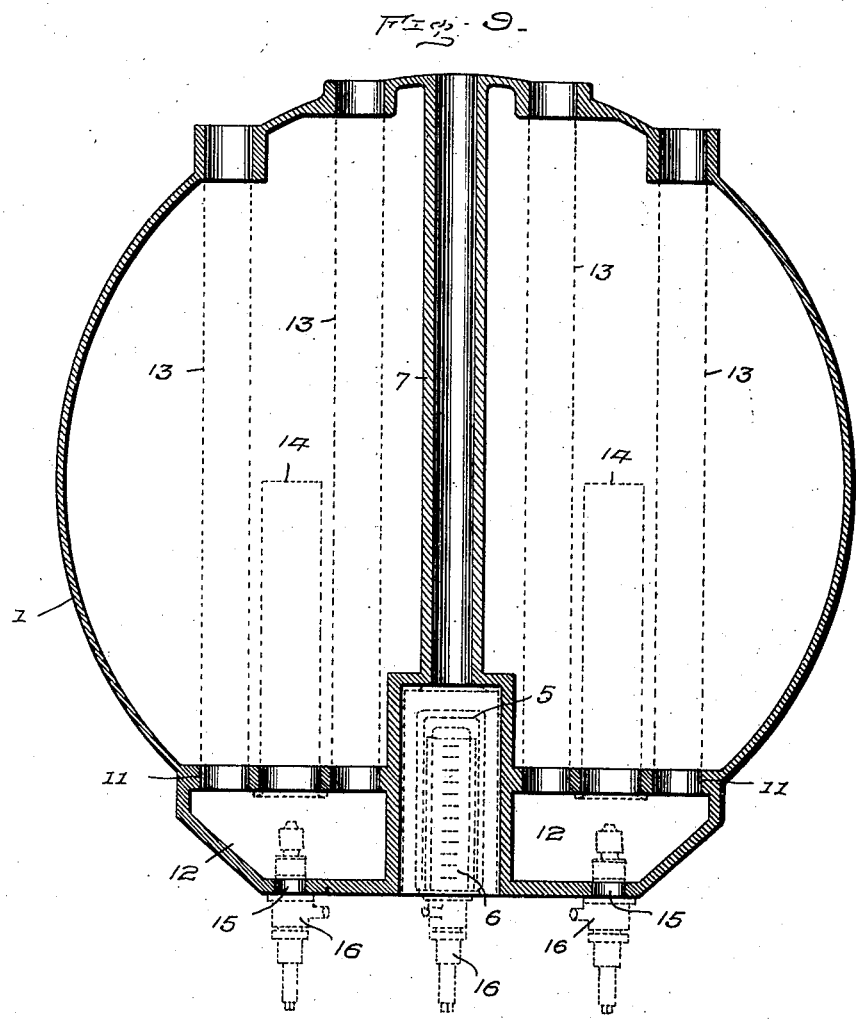
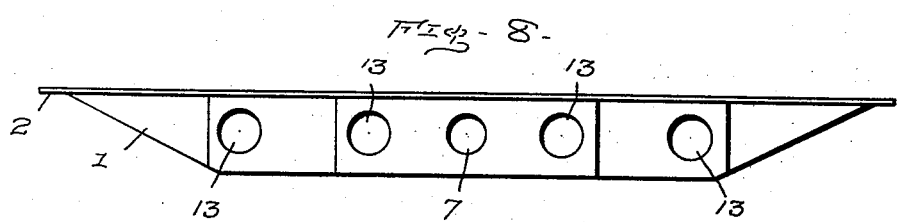
Inventor
Hartley O. Baker
Fitz Gerald & Co
Attorneys

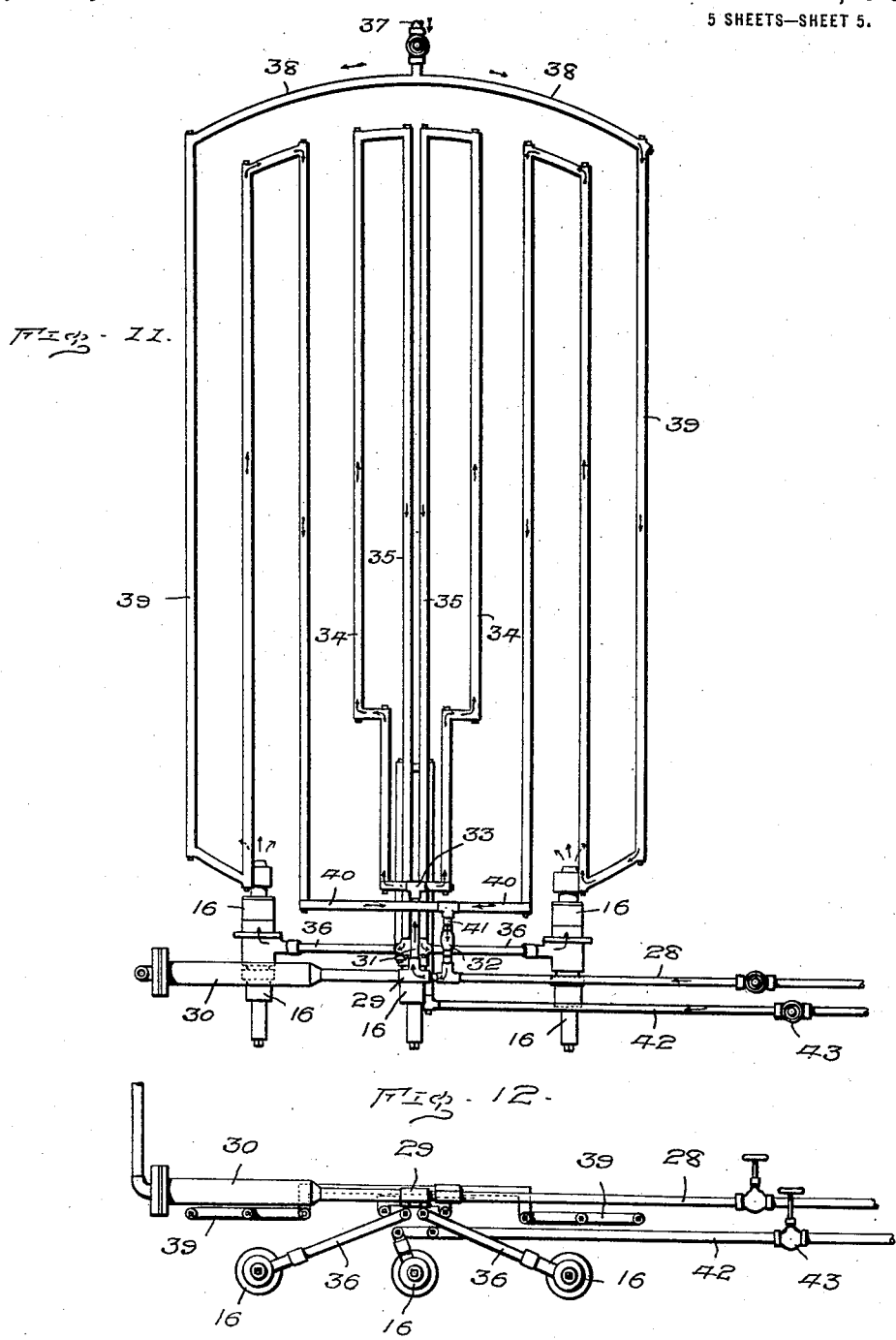

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

HYDROCARBON-BURNER.

1,323,998. Specification of Letters Patent. Patented Dec. 2, 1919.

Application filed February 26, 1918. Serial No. 219,284.

*To all whom it may concern:*

Be it known that I, HARTLEY O. BAKER, a citizen of the United States, residing at Pueblo, in the county of Pueblo and State of Colorado, have invented certain new and useful Improvements in Hydrocarbon-Burners; and I do hereby declare the following to be a full, clear, and exact description of the invention, such as will enable others skilled in the art to which it appertains to make and use the same.

This invention relates to steam generators and more particularly to the main burner and fuel vaporizer thereof.

The principal object of the invention is to construct the main burner to close the lower end of the generator casing, said burner being provided with mixing tubes and circuitous air passages leading to the mixing tubes whereby the air in its passage through said circuitous passages will be heated prior to its admixture with the hydrocarbon sprayed into the mixing tubes.

Another object of the invention is to preheat the air prior to its admixture with the gases and its passage through the burner and generator coils which eliminates the chilling of the burner and boiler tubes usual in all standard and other known generators or boilers.

A further object of the invention is to prevent the rushing of cold air directly into the main burner to eliminate or muffle the usual blowing or whistling of the burner when starting up or speeding against the wind.

A further object of the invention is to prevent the gases from lighting back to the burner tips when the main burner is shut off, by the air being drawn through circuitous air passages of the main burner, thus eliminating the impression of the ordinary observer that the burner is on fire.

A further object of the invention is to construct the main burner in such a manner and intimately associate with it the fuel vaporizing means that the flame or fire of the main burner will not over-heat the vaporizing means, thus preventing the formation of a heavy tarry substance or other foreign matter therein.

A still further object of the invention is to provide a two compartment main burner, each having a mixing tube and a circuitous air passage communicating with the mixing tube whereby the air will be pre-heated prior to its admixture with the hydrocarbon and to its passage into the respective compartments of the burner.

A still further object of the invention is to provide the main burner with a recess for the accommodation of a primary or pilot burner, said main burner being provided with an air passage extending through it and communicating with said recess to form an air supply for the primary burner.

A still further object of the invention is to provide a main burner which is of simple and inexpensive construction, and which can be quickly and readily disassembled.

With this and other objects in view, as will appear as the description proceeds, the invention comprises the various novel features of construction, combination and arrangement of parts as will be fully described hereinafter and afterward specifically claimed.

Referring to the drawings:

Figure 1 represents a plan view of the main burner operatively positioned within its housing.

Fig. 2 represents a sectional view taken on the plane indicated by the line 2—2 on Fig. 1.

Fig. 3 represents a plan view of the main burner proper disassociated.

Fig. 4 represents a front elevation of the main burner.

Fig. 5 represents a sectional view taken on the plane indicated by the line 5—5 on Fig. 3.

Fig. 6 represents a sectional view taken on the plane indicated by the line 6—6 on Figs. 3 and 4.

Fig. 7 represents a sectional view taken on the plane indicated by the line 7—7 on Figs. 3 and 4.

Fig. 8 represents a rear elevation of the bottom part of the main burner.

Fig. 9 represents a horizontal sectional view taken on the plane indicated by the line 9—9 on Fig. 4.

Fig. 10 represents a front elevation of the main burner housing.

Fig. 11 represents a plan view of the fuel vaporizer means, and

Fig. 12 represents a front elevation thereof.

In order that the construction and operation of the invention may be readily comprehended by those skilled in the art to which the invention relates, I have illustrated an approved embodiment thereof, in the accompanying drawings, and will now proceed to fully describe the same in connection with said drawings, in which 1 is the bottom part of the main burner, said part being dished and provided with a circumferential flange 2 upon which is mounted and detachably connected the corresponding flange 3 of the cover plate which is dished to provide an upstanding part 4.

The bottom part 1 is provided at its front with an inwardly extending recess 5 or the accommodation of a primary or pilot burner 6, shown in Fig. 1. A partition extends diametrically of the bottom part and is provided throughout its length with a central air passage 7 which establishes communication with the atmosphere at the back of the burner and the recess 5 and the primary burner positioned therein. The primary burner is constructed to exactly fill the recess 5 and its only means of air supply is through the passage 7 communicating with the interior thereof and the atmosphere.

The cover plate is provided diametrically with a rib 8 to rest upon the diametrical partition of the bottom part, said partition and rib serving to divide the burner into two compartments each entirely separated from the other. The cover plate is also provided with spaced grooves which extend in parallel relation from front to back of the burner. 10 indicates gas emitting slits which extend from one groove 9 to the next adjacent one. If desirable these slits may be dispensed with and perforations used in lieu thereof.

Partitions 11 extend in opposite directions within the burner from the primary burner compartment to the sides of the burner to provide air compartments 12. Each compartment of the main burner is provided with a pair of spaced air tubes 13 which establish communication between the air chambers 12 and the atmosphere in rear of the burner. An ordinary mixing tube 14 extends through each partition 11 into the center of each main burner compartment and as clearly shown in Fig. 9 is positioned between the air tubes 13. The front wall of each air chamber 12 is provided with an opening 15 in axial alinement with the mixing tubes 14, through which is adapted to project needle valves 16. From this construction it will be apparent that all air will be drawn through the hot tubes 13 and thoroughly heated prior to its admixture with the hydrocarbon which is shot into the mixing tubes from the needle valves 16. This preheating of the air prior to its admixture with the hydrocarbon will serve to make the burner more effective in its operation inasmuch as the burner and generator coils positioned immediately above will be prevented from becoming chilled as is the case with most generators or boilers. This elimination of the rushing of cold air into the main burner will prevent the roaring or whistling of the main fire which is so well known and annoying in generators of standard and well known construction. It will also be apparent that the air supplied through the passage 7 to the primary or pilot burner will be pre-heated by its passage through the main burner beneath the fire.

The primary or pilot burner is fed with hydrocarbon through the medium of a needle valve identical in construction with those previously maintained and indicated by the numeral 16. Since the pilot or primary burner and the needle valves are of special and novel construction, each of them are covered in separate applications, filed March 25, 1918, Serial No. 224,599, and filed March 13, 1918, Serial No. 222,153, respectively.

As shown in Figs. 1 and 2 the main burner is adapted to be removably mounted within a suitable housing 17, which embodies spaced inner and outer walls 18 and 19 separated by an asbestos or heat resisting packing 20, inner wall 18 projecting upwardly to provide a flange 21 for insertion within the lower end of the generator casing 22. This housing is adapted to be detachably connected in any suitable manner to the generator casing.

The housing 17 is provided at its front with an auxiliary housing 23 having a cover plate 24 detachably connected thereto by thumb nuts 25. This cover plate is provided with openings 26 whereby access may be readily had to the needle valves 16. The cover plate is also provided with a hand opening and a closure door 27 therefor. By opening the door 27 free and ready access may be had to the burner.

The main burner is constructed in a particular manner to coöperate with the fuel vaporizing means which is intimately associated with it as clearly shown in Figs. 1, 11 and 12. This vaporizing means consists of a plurality of fuel pipes connected in a manner to form a circuitous fuel passage as indicated by the arrows in Fig. 11. This fuel vaporizer is adapted to be so constructed and associated with the main burner that it will burn various grades and qualities of hydrocarbon without necessitating any change or adjustment in its structure. Each of the spaced parallel pipes forming the fuel vaporizer are of such diameter that when positioned within the grooves 9 of the main burner they will rest in a plane just below the flame of the main burner, thus by virtue of their being out of the flame preventing over-heating which causes the formation of a heavy tarry substance or other foreign deposits within the vaporizer fuel pipes.

By particular reference to Figs. 1, 11 and 12 it will be noted that the vaporizer is constructed to vaporize various kinds of hydrocarbon fuels such for instance as kerosene and gasolene without the necessity of any change in the structure. If it is desired to use gasolene as a fuel, it is fed under pressure through the valved pipe 28, which will close the check valve 32 in the pipe 41, and then through needle valve 29, which is controlled by the fluid or steam pressure regulator 30, pipe 31, T coupling 33 in opposite directions through the pipes 34 and 35, which latter passes over the pilot burner, and connects with the pipes 36 that are attached to the needle spray valves 16.

Should it be desired to use kerosene or heavy distillate, the valve in the gasolene feed pipe is closed and the valve in the kerosene feed pipe 37 opened, whereby it will be apparent that the kerosene will flow in opposite directions through the pipes 38, 39 and 40, to the pipe 41 through the check valve 32 to the pipe line 28 and thence through the needle valve 29, from where the fuel takes the same course as previously described in connection with the feeding of gasolene or lighter hydrocarbon.

42 is a fuel feed pipe leading to the pilot burner and is provided with a suitable controlling valve 43. This fuel feeding and vaporizing means is of a particular construction adapted for use in connection with this particular construction of main burner and is specifically covered in a separate application, Serial No. 222,153, hereinbefore referred to.

In this connection it is to be noted that since the main burner is provided with a plurality of spaced parallel grooves 9, that the vaporizing fuel pipes can be extended back and forth therethrough to either increase or decrease the length of the fuel circuit to effectively subject the fuel pipes to the proper amount of heat for burning various kinds of hydrocarbon, as it will be noted that the gasolene fuel circuit is of much shorter length than the kerosene circuit it being well understood that gasolene vaporizes more readily than kerosene.

From the foregoing description taken in connection with the accompanying drawings, it is to be understood that while I have described the principle of the operation of the invention together with the device which I now consider to be the best embodiment thereof, I desire to have it understood that such changes in construction and arrangement of parts may be made when desired as are within the scope of the appended claims.

Having thus fully described my invention what I claim as new is:

1. A burner comprising a hollow body having a top provided with outlets, a mixing tube extending within the body to deliver fluid to pass up through the top, and an air passage extending through said body parallel with the mixing tube at one side thereof and leading to said mixing tube.

2. A burner comprising a body provided with a compartment, a body having outlets leading from said compartment, a mixing tube extending within said body communicating with said compartment, and an air inlet tube extending through said compartment parallel with the mixing tube at one side thereof and leading to the mixing tube.

3. A burner comprising a hollow body having a top provided with outlets, an air chamber, a mixing tube extending from said chamber into the body to deliver fluid to pass up through the top, and an air intake passage extending through the body parallel with the mixing tube at one side thereof and communicating with said chamber.

4. A burner comprising a body having a gas compartment, a top having outlets communicating with said gas compartment, an air chamber, a mixing tube extending from said chamber into said compartment, and an air intake tube extending horizontally through said compartment underneath said top and communicating with said air chamber.

5. A burner comprising a body having a gas compartment, an air chamber, a top having outlets for the flow of gas therethrough from the gas compartment, a fuel feed entering the air chamber, a fuel inlet between said compartment and chamber for the flow of fuel into said compartment from the air chamber, and an air intake tube extending through said compartment horizontally underneath said top and leading to the air chamber.

6. In combination, a generator burner embodying a gas chamber, an air chamber at the front of said burner, a recess formed in the front of said burner for the accommodation of a pilot burner, a hot air passage extending through said burner and establishing communication between the atmosphere and the pilot burner, a mixing tube extending into said gas chamber from the air chamber, and a hot air tube extending through the gas chamber and establishing communication between the atmosphere and said air chamber.

7. A generator burner having a diametrical partition dividing the burner into two compartments, an air chamber at the front of each compartment, a mixing tube projecting into each compartment from each respective air chamber, and hot air tubes extending through said compartments and establishing communication between the atmosphere and said air chambers.

8. A generator burner formed at its center front portion with an inwardly extending recess for the accommodation of a pilot burner, a partition extending from said recess diametrically across the interior of the burner and dividing it into two compartments, said partition being provided with an air passage establishing communication between the atmosphere and said pilot burner recess, an air chamber formed at the front of each burner compartment, a mixing tube projecting into each compartment from each air chamber, and hot air tubes extending through said compartments and establishing communication between the atmosphere and said air chambers.

9. A generator burner comprising a lower part and an upper part adapted to be detachably connected together, said lower part being provided with a recess extending in from its center front portion, a diametrical partition extending from said recess to the back of the lower part and dividing it into two compartments, an air chamber formed at the front of each compartment, a mixing tube extending into each compartment from each air chamber, and hot air tubes extending through the compartments and establishing communication between the atmosphere and said air chambers, said top part of the burner being provided with a diametrical rib adapted to rest on said diametrical partition and also formed at its front with a recess corresponding to said first named recess.

10. A vaporizing system comprising a burner, vapor generating piping arranged to be heated thereby and having its discharge end delivering vapor to the burner, supply pipes for different grades of liquid fuel connected to the piping at different distances from the discharge end of the piping according to the density of the fuels so that the heavier fuels flow through a proportionately greater length of the generator piping than the lighter fuels, in order that each grade of liquid fuel is properly generated.

11. A vaporizer system comprising the combination with the main generator burner, of a plurality of pipes arranged on the burner to form a circuitous passage for the lighter hydrocarbon fuels, a controlling valve for said fuel passage, means to automatically regulate the admission of fuel to said circuitous passage, additional pipes arranged on the burner and connected in circuit with said first fuel pipes to form a circuitous passage of greater length than the first mentioned one for the heavier hydrocarbon fuels, a controlling valve for said last fuel passage, and a check valve arranged in the connection between said fuel passages.

12. A vaporizing system comprising a burner, vapor generating piping arranged to be heated thereby and having its discharge end delivering vapor to the burner, supply pipes for different grades of liquid fuel connected to the piping at different distances from the discharge end of the piping according to the density of the fuels so that the heavier fuels flow through a proportionately greater length of the generator piping than the lighter fuels, in order that each grade of liquid fuel is properly generated, and means for controlling the flow of fuel from the supply pipes into the generator piping to permit either grade of fuel to flow forwardly in the generator piping toward the discharge end thereof.

In testimony whereof I have signed my name to this specification in the presence of two subscribing witnesses.

HARTLEY O. BAKER.

Witnesses:
  SARA McKENZIE,
  PAULINE S. BROWN.